(12) United States Patent
Kristan et al.

(10) Patent No.: US 12,404,649 B2
(45) Date of Patent: Sep. 2, 2025

(54) FLOATING BUILDING DEVELOPMENT

(71) Applicant: Joshua & Holger Kristan GbR, Wuppertal (DE)

(72) Inventors: Joshua Kristan, Wuppertal (DE); Holger Kristan, Remscheid (DE)

(73) Assignee: Joshua & Holger Kristan GbR, Wuppertal (DE)

( * ) Notice: Subject to any disclaimer, the term of this patent is extended or adjusted under 35 U.S.C. 154(b) by 137 days.

(21) Appl. No.: 18/255,497

(22) PCT Filed: Nov. 17, 2021

(86) PCT No.: PCT/EP2021/081953
§ 371 (c)(1),
(2) Date: Jun. 1, 2023

(87) PCT Pub. No.: WO2022/117340
PCT Pub. Date: Jun. 9, 2022

(65) Prior Publication Data
US 2024/0026629 A1    Jan. 25, 2024

(30) Foreign Application Priority Data
Dec. 2, 2020    (DE) .................... 10 2020 131 927.4

(51) Int. Cl.
*E02D 27/06* (2006.01)
*E02D 27/34* (2006.01)
(Continued)

(52) U.S. Cl.
CPC ............ *E02D 27/06* (2013.01); *E02D 27/34* (2013.01); *E02D 27/36* (2013.01); *E04H 9/02* (2013.01); *E04H 9/14* (2013.01)

(58) Field of Classification Search
CPC .. E04H 9/02; E04H 9/14; E04H 9/145; E02D 27/06; E02D 27/34; E02D 27/36
See application file for complete search history.

(56) References Cited

U.S. PATENT DOCUMENTS 2,189,486 A * 2/1940 Amico ................ E04B 1/34363
137/861
2,715,756 A * 8/1955 Carver ................... E04H 9/145
52/274

(Continued)

FOREIGN PATENT DOCUMENTS

CN    105730642 A    7/2016
CN    108487466 A    9/2018

(Continued)

OTHER PUBLICATIONS

International Search Report of PCT/EP2021/081953, mailed Mar. 1, 2022; English Translation.
German Search Report of DE102020131927, mailed Jul. 26, 2021.

*Primary Examiner* — Frederick L Lagman
(74) *Attorney, Agent, or Firm* — Dickinson Wright PLLC

(57) ABSTRACT

A building development (1), having a building (4) arranged on a building development base (2), wherein the building development base (2) has a pontoon (8) having at least one float (6) for floating on a liquid and a pile mooring (10), which extends through a passthrough opening (14) of the pontoon (8) along a pile mooring axis (X) perpendicularly to the pontoon (8). The passthrough opening (14) is configured centrally in the pontoon (8), and the pontoon (8) is rotationally movably mounted around the pile mooring (10) that extends through the passthrough opening (14). The pontoon (8) can be aligned and positioned around a pile mooring axis (X), wherein the pile mooring (10) projects into the receiving chamber through the passthrough opening (14) of the pontoon (8) and through a first breakthrough (16) arranged in a bottom of a receiving chamber, arranged above the passthrough opening (14). The invention relates further to a building development base (2) and a pile mooring (10) of such a building development (1).

27 Claims, 7 Drawing Sheets

(51) Int. Cl.
*E02D 27/36* (2006.01)
*E04H 9/02* (2006.01)
*E04H 9/14* (2006.01)

(56) References Cited

U.S. PATENT DOCUMENTS

| | | | | |
|---|---|---|---|---|
| 3,232,015 | A * | 2/1966 | Latham | E04B 1/36 |
| | | | | 52/294 |
| 3,626,702 | A * | 12/1971 | Monahan | E02D 31/02 |
| | | | | 52/169.1 |
| 5,647,693 | A * | 7/1997 | Carlinsky | E02D 5/00 |
| | | | | 52/169.9 |
| 5,775,847 | A * | 7/1998 | Carlinsky | E02D 27/32 |
| | | | | 52/169.9 |
| 5,904,446 | A * | 5/1999 | Carlinsky | E02D 27/32 |
| | | | | 52/169.9 |
| 6,347,487 | B1 * | 2/2002 | Davis | E04H 9/145 |
| | | | | 52/64 |
| 7,607,864 | B2 * | 10/2009 | Kenady | B63B 35/44 |
| | | | | 405/196 |
| 7,793,466 | B2 | 9/2010 | Bouchain et al. | |
| 7,921,604 | B2 | 4/2011 | Lino | |
| 8,011,159 | B1 * | 9/2011 | Saebi | E04H 9/145 |
| | | | | 405/219 |
| 8,066,451 | B2 * | 11/2011 | Ewers | E04H 9/14 |
| | | | | 405/195.1 |
| 8,777,519 | B1 * | 7/2014 | Henderson | E04H 9/0235 |
| | | | | 52/167.1 |
| 9,103,118 | B2 * | 8/2015 | Henderson | E04H 9/028 |
| 10,711,478 | B2 | 7/2020 | Henderson | |
| 2004/0261338 | A1 | 12/2004 | De Cherance | |
| 2007/0163483 | A1 * | 7/2007 | Chelaru | E04G 21/161 |
| | | | | 405/201 |
| 2008/0196322 | A1 | 8/2008 | Bouchain et al. | |
| 2009/0113812 | A1 | 5/2009 | Lino | |
| 2011/0123275 | A1 * | 5/2011 | Nelson | B63B 35/44 |
| | | | | 405/195.1 |
| 2013/0199113 | A1 * | 8/2013 | Nelson | B63B 35/44 |
| | | | | 52/741.15 |
| 2019/0323255 | A1 | 10/2019 | Henderson | |

FOREIGN PATENT DOCUMENTS

| | | | | |
|---|---|---|---|---|
| EP | 3015626 | A1 | 5/2016 | |
| FR | 3051010 | A1 | 11/2017 | |
| GB | 2477163 | A * | 7/2011 | E04H 9/145 |

* cited by examiner

FLOATING BUILDING DEVELOPMENT

CROSS-REFERENCE TO RELATED APPLICATIONS

This application is a 35 U.S.C. § 371 national phase of PCT International Application No. PCT/EP/2021/081953, filed Nov. 17, 2021, which claims the benefit of priority under 35 U.S.C. § 119 to German Patent Application No. 10 2020 131 927.4, filed Dec. 2, 2020, the contents of which are incorporated herein by reference in its entirety.

FIELD OF THE INVENTION

The invention relates to a building development having a building arranged on a building development base. The building development base has a pontoon having at least one float for floating on a liquid and at least one pile mooring. The pile mooring extends along a pile mooring axis perpendicularly to the pontoon through a passthrough opening of the pontoon.

The invention furthermore relates to a building development base and a pile mooring of such a building development.

BACKGROUND

A building development of the generic type of floating houses is known from the prior art, where said floating houses are arranged on a body of water, especially a lake, the ocean, or a river. Such floating houses are translationally and rotationally retained in their respective position on the body of water by means of pile moorings.

For a realignment of the pontoon on the water surface, it is necessary in the known building developments to separate these from the pile mooring and/or the anchors and thus enable the translational movement as well as also the rotational movement of the pontoon on the water surface. This procedure is complex and time-consuming.

It is furthermore known that floating houses are configured in such a way that they can float upward or downward relative to the pile mooring along the pile mooring axis along with a surface level of the water along a displacement area, especially with a high water or low water level, so that at least one side of the pontoon always projects out of the water. The building development can thus adapt to changing surface levels of the water. This allows the use of water surfaces as building development surfaces without an expensive draining of the bodies of water and flood protection measures.

In one aspect, it is disadvantageous of the known houses, especially houses floating on pile moorings, that they present a large contact surface for wind gusts and/or whirling objects during a storm. Due to the wind-induced forces, great forces additionally act on the pile moorings and can cause damage to the pile mooring and/or the pontoon.

It can additionally be disadvantageous, in particular when resource-consuming applications are arranged in buildings, such as, for example, a washbasin or a wall outlet, that the corresponding supply lines must be installed by a supplier in the building development base. As an alternative to this, there are also known self-sufficiency concepts, involving, for example, wind and/or solar energy and/or desalinization systems and/or water reservoirs and/or sewage treatment systems. The wastewater produced by them is often collected in tanks which must be regularly emptied.

In order to connect the known building developments to an external supplier, it is known that they can be connected to at least one supply line running essentially parallel to the water surface, frequently a flexible cable and/or a flexible tube. The supply lines often extend over long distances, so that they are exposed to the weather and/or water and thus age faster as a result of the movements caused by the varying surface levels of the water. From an esthetic point of view, these lines are also not visually appealing. In addition, the known supply lines can be seen from the outside and are relatively easy to access, particularly for unauthorized interference by third parties.

The supply lines of known building developments can furthermore be configured with a tolerance in such a way that they can compensate for a displacement during an axial displacement of the pontoon along the pile mooring axis, for example, during high water. This occurs for the most part in that a flexible line, especially a loose cable, has a length adapted to the greatest displacement path, whereby the line, with a neutral positioning within the displacement path due to its dimensioning, requires a larger installation space and is often loosely guided.

Despite the known disadvantages, floating housing concepts have the advantage that due in particular to the floating arrangement of the pontoon on the liquid, seismic vibrations are damped, for example during earthquakes. Floating houses also have the advantage compared to classical foundation constructions on solid ground that they can float in the event of a flood, and the buildings are less prone to water ingress.

Furthermore, with regard to rotation and translation, classical buildings and floating houses are tied a certain place: classical building due to their foundations, and floating structures due to their pile moorings, so that a building, in particular, is always arranged facing in one direction, and the sun shines on the building from different directions throughout the day. It is particularly disadvantageous for the occupants that they must adapt their use of spaces in the building to the height of the sun; for example, it is not possible, given the room layout and room size, to enjoy a dawn and a sunset from the same room. Furthermore, the solar panels of a photovoltaic system are usually aligned, at least to some extent, in one direction. With known buildings, the position of the sun, which changes relative to the building, reduces the efficiency of the solar panels. It can furthermore be disadvantageous with known buildings that, depending on the room layout of the building, inside spaces are not shielded from the view of others or from direct sunlight, and that the façade of the building which sustains gusts of wind during a storm also cannot be changed, so that, for example, the wind and objects that are picked up and carried by the wind are blown against a glass front of the building, which is more vulnerable than an adjacent walled façade.

SUMMARY

It is an object of the invention to make available a building development which avoids the problems associated with positioning or alignment that are known from the prior art and in particular provide protection against unauthorized interference by third parties and/or environmental influences in particular, especially environmental catastrophes.

The object is inventively achieved by means of the features of embodiments described herein. Precise solar radiation and optimized light incidence on the building development are made possible in that the passthrough opening is configured in the center of the pontoon, and the pontoon is manually and motorically rotationally movably mounted around the pile mooring which extends through the passthrough opening, wherein the pontoon can be aligned and positioned, in particular by 360° around the pile mooring axis, wherein the pile mooring projects into a receiving chamber through the passthrough opening of the pontoon and through a first breakthrough in a bottom of the receiving chamber arranged above the passthrough opening.

The rotation of the pontoon around the pile mooring, for example, during the summer, also makes it possible, if required, to turn one side of the building away from too intense solar radiation against windows/glass surfaces. In the winter months, the reverse rotation around the pile mooring makes it possible to direct the heat of the sun against a selected side of the building.

With regard to comfort, it is additionally possible to decide at all times which view of the surroundings will be given to users, residents, and/or guests in the building, as well as choosing the view of or into the building that will be allowed to those outside it.

The building can likewise be optimally positioned for protection against storms; the building can, in particular, be positioned in such a way that there is an especially good flow of air around the building and/or that an especially robust façade of the building faces the direction from which the wind is blowing.

The object of the invention is furthermore achieved by means of the features of additional features described herein. The building development base can be especially advantageously arranged independently of natural bodies of water in that the building development base has a basin filled with liquid, wherein the pontoon is arranged floating on the liquid in the basin, and wherein the pile mooring extends from a bottom of the basin along the pile mooring axis. The building development base has an advantageous damping effect, especially in areas prone to earthquakes. A building development base of this kind can accordingly be used as a foundation of a building and offers an alternative to the known concrete foundations. The basin in particular serves as a buffer against the primary energy of an earthquake; constructed in a clearly predefined sand/gravel bed, it offers fewer static contact surfaces. Thus only a low seismic magnitude of ultimately secondary energy acts on the building arranged on the pontoon, or on the building development base.

The rotationally movable pontoon with a pile mooring arranged in the center of the pontoon can be suitably arranged on the liquid located in the basin.

The rotationally movable pontoon can be effectively aligned and positioned so as to rotate, preferably by 360°, around the pile mooring axis by means of a motor that is immovable relative to the pontoon. A gearing is preferably configured and arranged in such a way that the force of the motor can act on a load-application element of the pile mooring. An electric motor, particularly one that is digitally controlled, is preferably used. Particularly advantageously, the digital control enables an automated positioning which is dependent, for example, on the time, position of the sun, or the room temperature of a building that may be arranged on the building development base.

According to one variant of the invention, at least one connection means for connecting at least one supply line for a connection system of the building is arranged in the receiving chamber, wherein the pile mooring is configured as a hollow body and has at least one supply channel; and at least one supply line of the connection system is guided through the supply channel, which is connectable to the connection means in the receiving chamber. The supply line is advantageously protected from external influences, and no additional installation space is required, which could create obstacles. The connection system can, in particular, be a water and/or wastewater and/or electric power and/or telecommunications system.

The supply line can furthermore be arranged underground and can, in particular, be installed in the building by a utility provider through the foundation of the pile mooring and in that way be invisible from the outside, so that unauthorized interference by third parties is made more difficult. In this sense as well, the visual appearance of the building is not disadvantageously affected, and the connection system is protected from environmental influences.

In order to maintain the rotational mobility, the supply line is configured in particular in such a way that it can compensate for a rotation of the pontoon around the pile mooring, in particular by 360°, for example by at least one connection means is configured as a mechanical latch contact and/or a loop contact and/or a ball-bearing mounted plug-in contact for the electrical lines and/or a pivotable coupling and/or a rotatable high temperature pipe connection for the water lines and/or a pipe-to-pipe connection running coaxially to the pile mooring axis in order to simultaneously conduct a wastewater flow and a freshwater flow.

A connection means is preferably configured as a loop contact with a current collector fixed with respect to the pontoon and a slip ring rotationally fixedly arranged on the pile mooring. Metal rails, in particular five metal rails, are suitably circulatingly arranged around the slip ring, wherein the current collector can contact the metal rails within an angular section of 360° around the pile mooring axis.

According to an advantageous embodiment, intermediate reservoirs, in particular a freshwater reservoir and/or a wastewater reservoir, can be arranged in the pontoon and/or in the building. The freshwater reservoir and/or wastewater reservoir consists in particular of several, in particular four, circumferentially interconnected tanks, preferably plastic tanks. In order to fill and empty the intermediate reservoir, the pontoon is aligned in a supply position relative to the pile mooring. In the supply position, the intermediate reservoirs can be manually or automatically connected to the supply lines arranged in the pile mooring, in particular by means of a motorized rail and a bayonet closure.

The liquid in the basin, in particular, at least in part, contains additives, wherein the additives preferably lower the freezing point of the water. The risk of frost damage in particular is reduced. In this way, the erection and use of a building development with a basin is also possible or is also advantageously facilitated in locations prone to freezing. Additionally, or alternatively, the liquid can also contain additives for purifying liquid and/or for preventing the growth of algae.

The basin is advantageously provided with an integrated inlet and outlet, preferably supported by pumps. The inlet and outlet makes possible especially that a surface level of the liquid in the basin can be variably selected and readjusted. The variable level has the advantage that the pontoon together with the building can be lowered into or lifted out of the basin. This provides the possibility of adjusting the building development to a total load on the building development base, similarly as with a level regulation system, in that a predetermined distance between the pontoon and the bottom of the basin is maintained. In particular, the draft of the pontoon relative to the liquid surface is not influenced by the surface level of the liquid. Beside the advantage for comfort, the building development can also be adapted to the user with regard to accessibility. In addition, or as an alternative, the inlet and outlet also enable the purification and/or heating and/or replacement of the liquid, also, in particular, without influencing the surface level of the liquid.

The pontoon is configured, in particular by means of the variable surface level of the liquid, so as to be axially displaceable with respect to the pile mooring along the pile mooring axis within a displacement range. The building and/or the building development base has suitable connection means for connecting at least one supply line for a connection system of the building. As protection from outside interference, the supply line preferably passes, as previously described, through the supply channel of the pile mooring. The supply line is advantageously configured such that it can compensate for an axial displacement of the pontoon relative to the pile mooring along the pile mooring axis. This can be achieved, for example, in that at least one supply line is configured as a telescoping line.

The displacement area of the pile mooring is suitably configured in the direction of the liquid in such a way that in the low-lying position of the pontoon, the building is arranged within the basin over part of its height. The advantage herein is that through the immersion of the building, protection from intense storms, such as hurricanes or tornados, is achieved due to a reduction of the surface area of the building that is exposed to the wind.

The basin is preferably configured with an integrated means of overflow protection especially in rainy areas. This can be suitably implemented by means of floating valves. In this way, a maximum surface level for the liquid in the basin can be effectively set in a particularly easy and error-resistant manner.

The building preferably has a second breakthrough in a ceiling of the receiving chamber or in the roof of the building in the area above the passthrough opening, so that an overhang of the pile mooring can be arranged in the second breakthrough, especially in the low-lying position of the pontoon.

In a normal position of the pontoon relative to the pile mooring, the pile mooring preferably projects from the breakthrough into the receiving chamber with an overhang with respect to the bottom of the receiving chamber. The displacement area extends at least in part over the overhang so that the pontoon can float within the displacement area, at least from the normal position into an elevated position.

The normal position thereby corresponds in particular to a positioning of the pontoon relative to the pile mooring in which the pontoon is essentially arranged, that is in relation to the other positions, for most of the time. The displacement area extends, for example, between a normal position in which the pontoon is properly arranged and the elevated position, for example, with high water or a flood, when the pontoon floats to an exceptional height.

The size of the overhang thereby determines the maximum upward floatation height and can, in particular, be adapted to the existing rules for storm forecasts and disaster warnings.

The displacement area of the pile mooring is especially configured in such a way that the pontoon can sink, starting from the normal position of the pontoon relative to the pile mooring in the direction of the liquid into a low-lying position within the displacement range, for example, with low tide or a dropping liquid level.

The second breakthrough is advantageously provided with a manual or automatic lock for protection against weather conditions, which seals the second breakthrough if the pile mooring is not arranged in the second breakthrough.

The pontoon is advantageously provided with a manual and/or automated, in particular an hydraulic level regulation system. The level regulation system essentially aligns the surface of the pontoon that faces toward the building within a horizontal plane with respect to the surface of a liquid by means of displaceable load entries in floats. The level regulation system is particularly advantageously configured such that it can constantly monitor and preferably constantly readjust the alignment of the pontoon. The level regulation system can compensate for weight differences, depending on the design of the building development, or the weight distribution over the building development base. The level regulation system is preferably also provided with an alarm unit which sends a signal to the user and pinpoints the location of the critical weight difference in the event a weight difference can no longer be compensated for. The user who uses the alarm system is thus enabled to locate and adapt the weight distribution over the building development base.

The pontoon is especially provided with one or several floats, wherein preferably one float has individual chambers which, depending on the weight distribution, can be statically or dynamically adapted to the weight difference by the level regulation system. Individual chambers or the entire floating installation can be filled, for example, with the liquid on which they float, or the liquid can be redistributed from the chambers or the floats into other chambers or floats.

As an alternative or in addition, the level regulation system can be improved or deployed by means of fluidic intermediate reservoirs arranged circumferentially in the pontoon. The liquids in the tanks of the freshwater reservoir or the wastewater reservoir can suitably be systematically recirculated with the aid of a pump. The weight distribution of the pontoon can in this way be advantageously dynamically adjusted to variable loads.

The building can be suitably supplemented with a fire-resistant roof construction. This is advantageous in the case of buildings that are at risk from wildfires, particularly in regions with a climatic tendency to drought and/or endemic drought.

The submersible building development base, in combination with a fire-resistant roof area of the building, advantageously ensures protection of the building in case of fire in the immediate area. To this end, the building is suitably provided with a water-tight, tub-like, flat roof construction, which comprises a water basin. Using the pumping system, the water basin can be flooded, in particular in the event of fire in the immediate surroundings, with the liquid that is temporarily no longer needed, suitably the liquid in the basin.

Particularly advantageous is a circumferential roof overhang, which, when the building is lowered, slots flush with the ground into a channel that runs around the upper basin edge, in particular with a flute. The channel is flooded, if necessary, with a liquid, for example water, which enables cooling and provides protection from invasive flue gases. Advantageously, with this preferred embodiment, when the building or the building development base is lowered, no physical resistance stands in the path of the fire, and as a result, even a wildfire driven by strong winds, for example a firestorm, quickly passes over the building development without finding local fuel for the flames.

Fire-resistant materials have proven advantageous for the flat roof construction and/or roof overhang. The flat roof construction and/or roof overhang are formed, in particular, from alloyed and/or unalloyed steel and/or ceramic composites.

The results of small-scale trials with a simulated fire source showed a moderate evaporation of the surface water and simultaneous heating to approx. 35° C.

The roof building development suitably has a rooftop garden with low lichens and/or moss and/or grass or can be planted with greenery. A plant substrate, which consists at least in part of native soil and is enriched with perlite and expanded clay, in particular for weight reduction, is preferably used for the greenery. All of the aforementioned embodiments can be advantageously configured in modular form. Thus, even a relocation of the building development across land or water can be realized with the aid of prefabricated components ranging from a multipart pontoon to displaceable wall elements and a standardized basin. A modular design also enables an individual adaptation of the building to the respective environmental conditions and preferences.

The object of the invention is also achieved with a building development base, wherein the base of building development has a pontoon on which a building development, in particular a building, can be arranged. According to the invention, the building development base for achieving the task corresponds to one of the aforementioned embodiments.

The object of the invention is based is furthermore attained by means of a pile mooring having the features described herein, which has the features of one of the aforementioned embodiments of the pile mooring according to the invention.

BRIEF DESCRIPTION OF THE DRAWINGS

Other advantageous embodiments of the invention arise from the following description of the drawings and the dependent claims, wherein:

DETAILED DESCRIPTION OF EXEMPLARY EMBODUMENTS OF THE INVENTION

Figure 1:
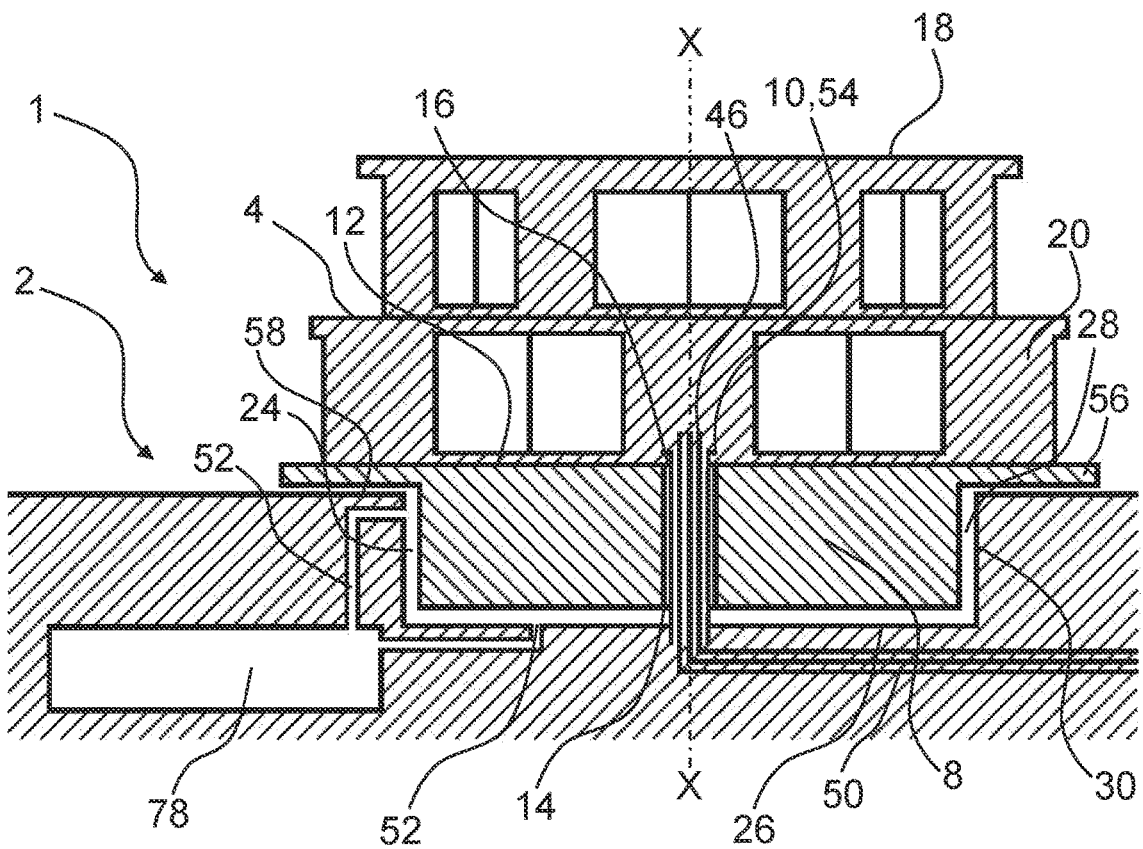
FIG. 1 shows a partial section view axially to a pile mooring axis through a first embodiment of a building development.

The same parts are always provided with the same reference numerals in the various figures of the drawing.

It is claimed with regard to the following description that the invention is not limited to the exemplary embodiments and consequently not to all or several of the features of the described combinations of features, but rather that each individual partial feature of the/each exemplary embodiment can as such be of importance to the object of the invention, also in isolation from all other partial features described in connection therewith, as well as in combination with any features of another exemplary embodiment.

FIGS. 1 and 6 to 9 show the building development 1 having a building 4 arranged on a building development base 2.

Figure 10:
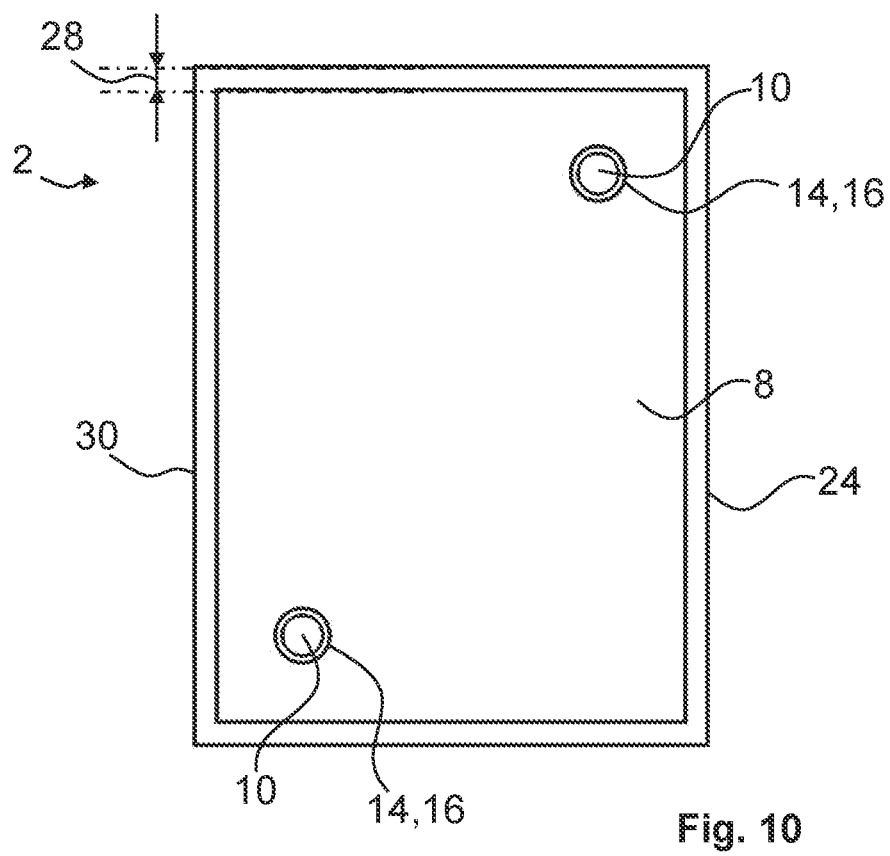
FIG. 10 shows a section view perpendicularly to the pile mooring axis through a pontoon configured in a rectangular shape.
Figure 11:
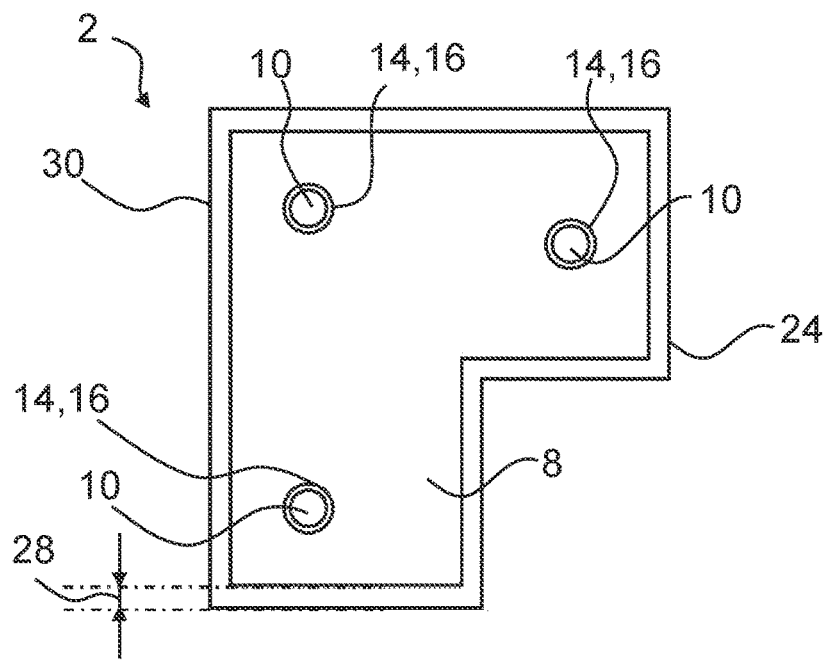
FIG. 11 shows a section view perpendicularly to the pile mooring axis through an L-shaped pontoon.

The building development base 2 has a pontoon 8 having at least one float 6 for floating on a liquid and at least one pile mooring 10. The building development 1 according to FIG. 1 has in particular only one pile mooring 10. The pontoon 8, in particular, as shown in FIG. 3 in plan view, is shown as having a round shape or a rectangular shape as shown in FIGS. 10 and 11. In FIG. 2 the float 6 of the pontoon 8 additionally shown. Here the building 4 is arranged on a surface 12 of the pontoon 8 that faces toward the building 4.

According to an embodiment that is not depicted, a pontoon 8 with more than one float 6 preferably has a supporting framework in which the float 6 can be stably arranged. The supporting framework, which holds together the individual floats 6, can be suitably replaced by connections of the individual floats 6 to each other. As a result, the floats 6 are connected to each other especially in a materially bonded or force-fitting or force-and-form-fitting manner, preferably screwed, glued, or welded.

The pontoon 8 or the float 6 can be advantageously made of metal, especially steel or aluminum, fiberglass, or carbon. They can also be made from a combination of materials, for example reinforced concrete, in alternative embodiments of the pontoon 8 or the float.

Figure 4:
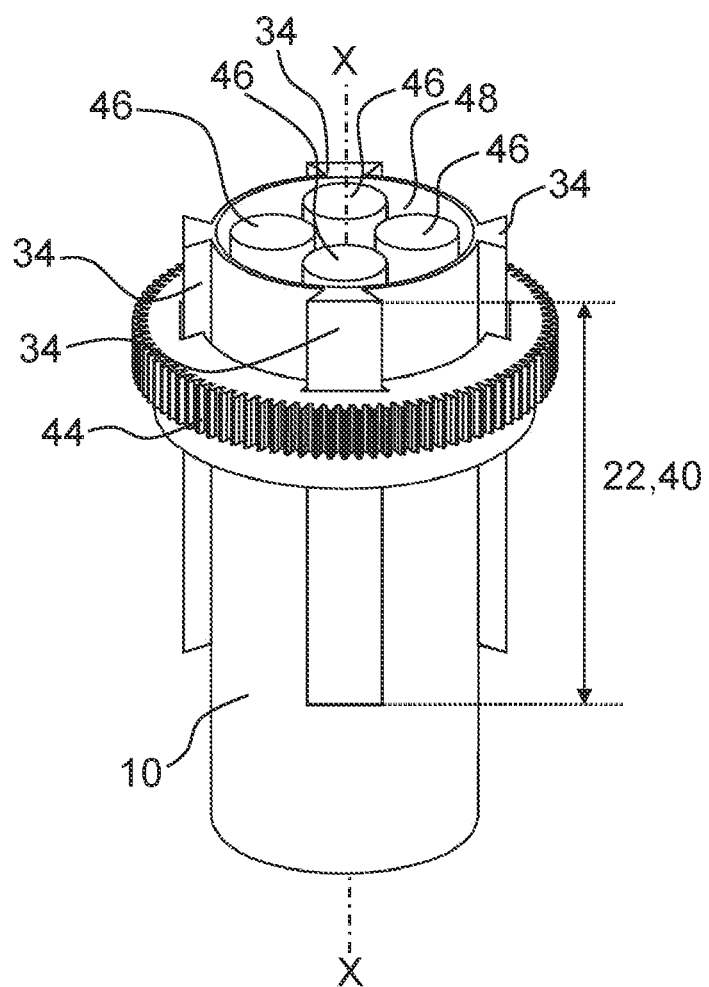
FIG. 4 shows a perspective representation of a pile mooring with the connection system guided within the pile mooring.
Figure 5:
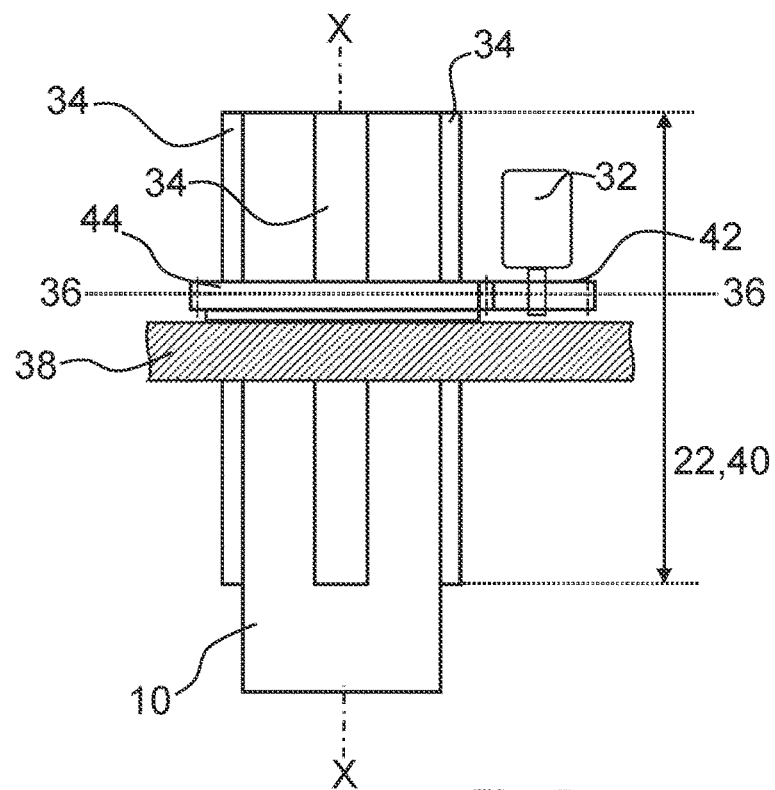
FIG. 5 shows a lateral view perpendicularly to the pile mooring axis in viewing-direction B according to FIG. 4 of the pile mooring according to FIG. 4, with one motor.
Figure 12:
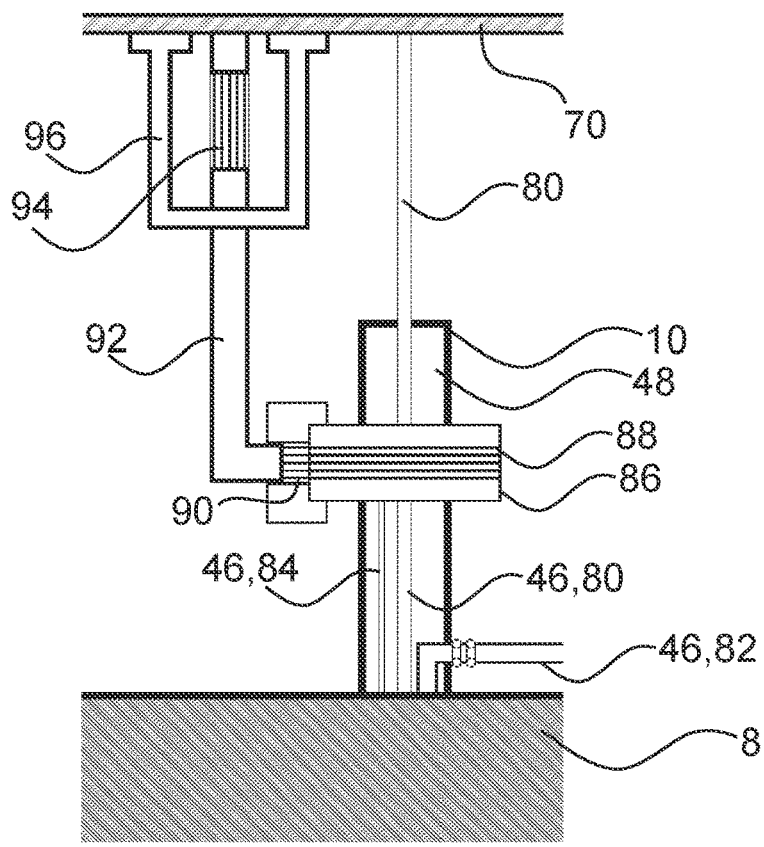
FIG. 12 shows a schematic representation, partially in section, of a receiving chamber of a building development.

The pile mooring 10 extends along a pile mooring axis X perpendicularly to the pontoon 8 through a passthrough opening 14 of the pontoon 8. Exemplary embodiments of the pile mooring 10 are depicted in FIGS. 4, 5, and 12. The pontoon 8 together with the building 4 can float up or down with the rise or fall of the liquid level or the surface of a liquid and can adapt in this way to environmental conditions or the user's wishes for protection and comfort.

The liquid can, in particular, be a naturally-occurring liquid in the form of water in a lake, ocean, river, or in a man-made pond, basin 24, or other collection body. The pile mooring 10 is thereby fixedly connected to a foundation on a bottom in the liquid, especially the bottom of a lake, ocean, river, a bottom 26 of the basin 24, a pond bottom, et cetera.

According to the invention, the passthrough opening 14 is configured centrally in the pontoon 8, as depicted in FIGS. 1 to 5, and the pontoon 8 is movably mounted, rotating manually or with a motor, around the pile mooring 10 which extends through the passthrough opening 14. The pontoon 8 can be aligned and positioned in particular by 360° around the pile mooring axis X, wherein the pile mooring 10 projects into the receiving chamber through the passthrough opening 14 of the pontoon 8 and through a first breakthrough 16 in a bottom of a receiving chamber arranged above the passthrough opening 14. The centrally arranged pile mooring 10 has, as a result, the advantage that an expensive mooring is not necessary in order to almost fully prevent a translational movement of the pontoon 8 over the liquid surface. A selected rotational movement of the pontoon 8 with respect to the pile mooring 10 is blocked with a mooring between the pontoon 8 and an immovable object, for example a shore or pier, or by means of a blockage between the pontoon 8 and the pile mooring 10.

Regarding the requirements of the user of this building development 1, it is an advantage when aligning the sun, for example, in order to focus sunlight on a living space, or when providing a pier for mooring a boat, if the pontoon 8 or the building 4 arranged on the pontoon 8 can be rotationally aligned, particularly by 360°, around the pile mooring 10.

Furthermore, when using a photovoltaic system, in particular on a roof 18 and/or on a façade 20 of the building 4, the rotation of the pontoon 8 enables a constant alignment of the photosensor cells which is adapted to the position of the sun and which preferably continuously self-corrects. The building development's foundation 2 is also able to rotate with the movement of the sun by means of a manual, or especially an automated alignment of the pontoon 8, thereby enabling a significantly optimized light incidence on the photosensor cells and a higher efficiency of the light and energy yield respectively.

The rotation of the pontoon 8 furthermore makes it possible to turn the building 4 away from possibly excessively intense solar radiation on windows/glass surfaces. The rotation around the pile mooring 10 likewise makes it possible to reverse the alignment toward the direct incidence of the heat of the sun.

With regard to the comfort, it is, in addition, always possible to decide what view of the environment will be given to the users, inhabitants, and/or guests of the building 4. Or to determine what view of or respectively into the building 4 will be permitted to those on the outside.

The pontoon 8 can be axially displaced, in particular inside the displacement range 22 along the pile mooring axis X relative to the pile mooring 10. A changing level of the liquid, for example due to wave action, flood, or a low surface level of the liquid can, for example, be especially compensated for in this way.

In another embodiment according to the invention, as a supplement or alternative to the rotating house with a central pile mooring 10, the building development base 2 has a basin 24 filled with liquid, wherein the pontoon 8 is arranged floating on the liquid in the basin 24. Along the pile mooring axis X, the pile mooring 10 extends from a bottom 26 of the basin 24, wherein the pile mooring 10 is immovably connected to the basin 24. Embodiments of this building development 1 with a building development base 2 having the basin 24 are depicted in FIGS. 1 and 6 to 9.

Figure 2:
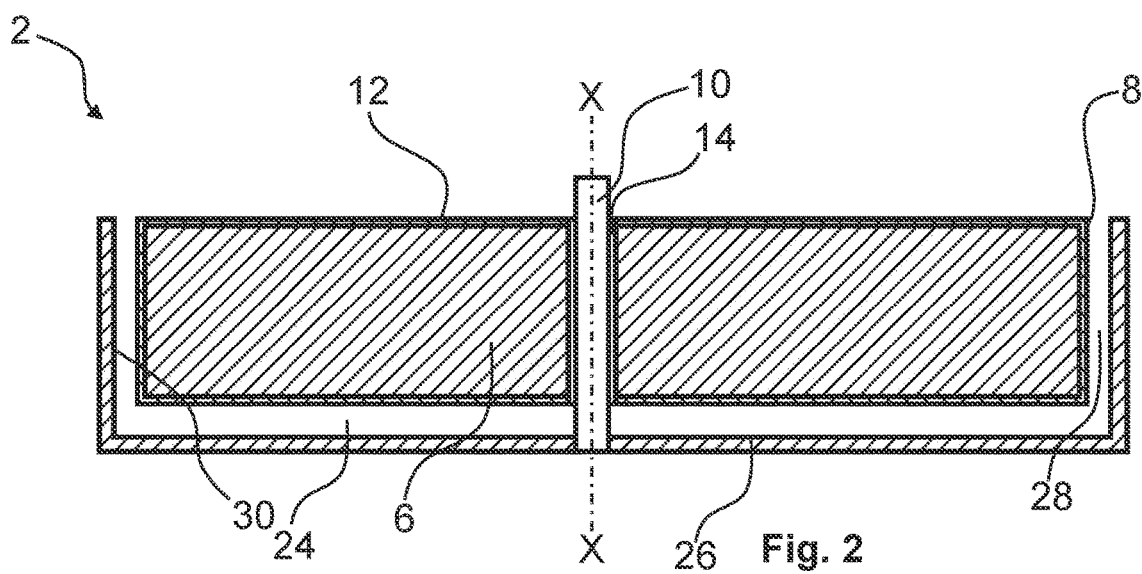
FIG. 2 shows a section view axially to a pile mooring axis through an embodiment of a building development base.
Figure 3:
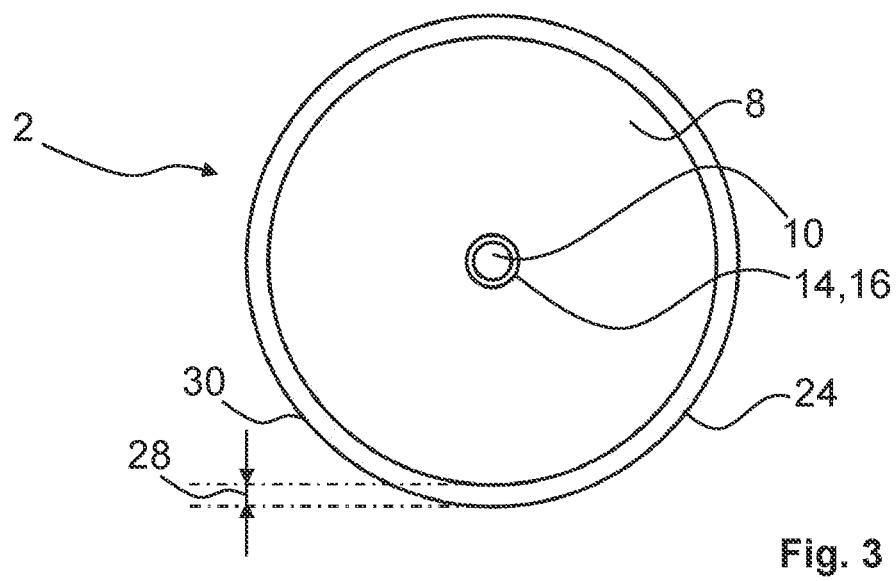
FIG. 3 shows a section view perpendicularly to the pile mooring axis, along A-A according to FIG. 2, through a building development base.
Figure 6:
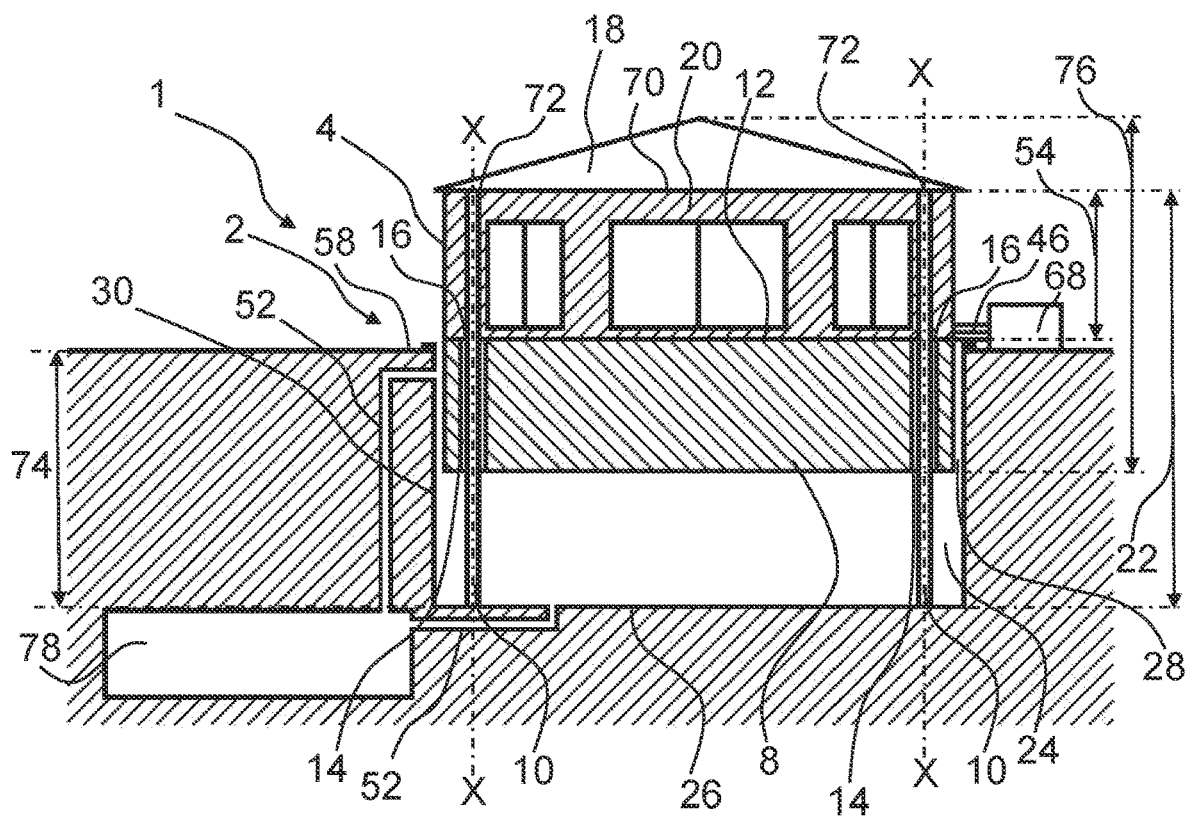
FIG. 6 shows a partial section view axially to a pile mooring axis through another embodiment of a building development in normal position.
Figure 7:
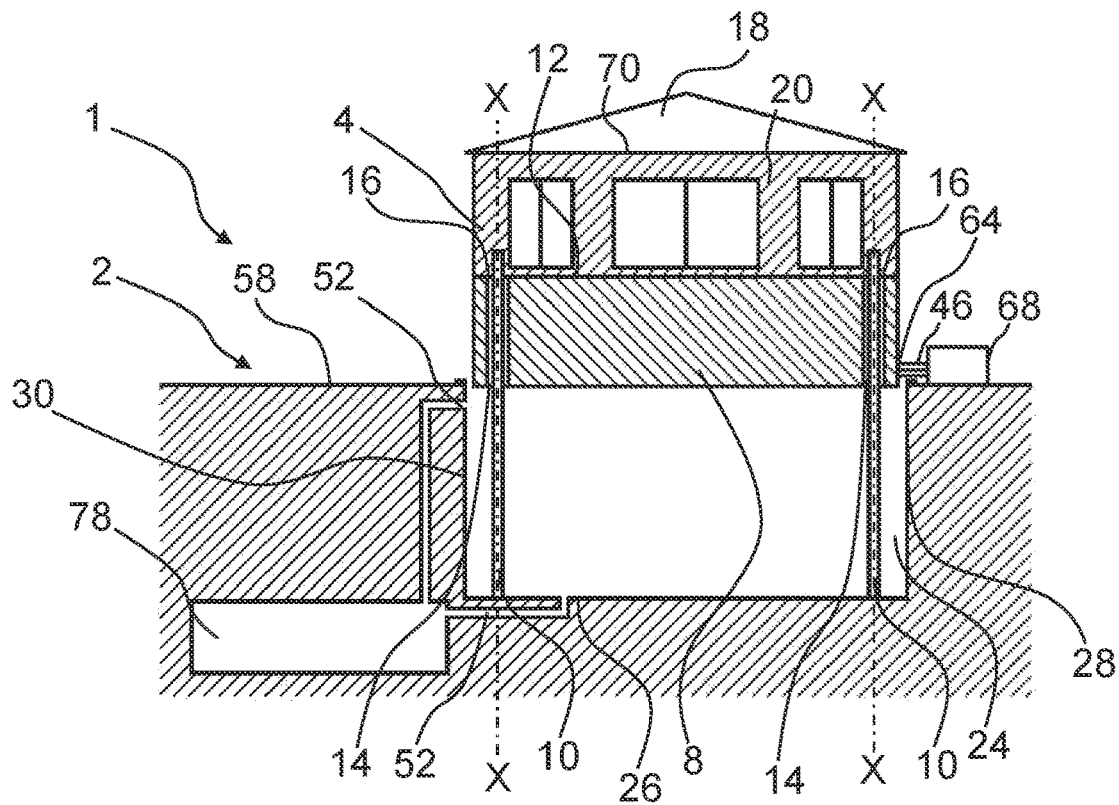
FIG. 7 shows a partial section view axially to a pile mooring through the embodiment of the building development in FIG. 6 in an elevated position.
Figure 8:
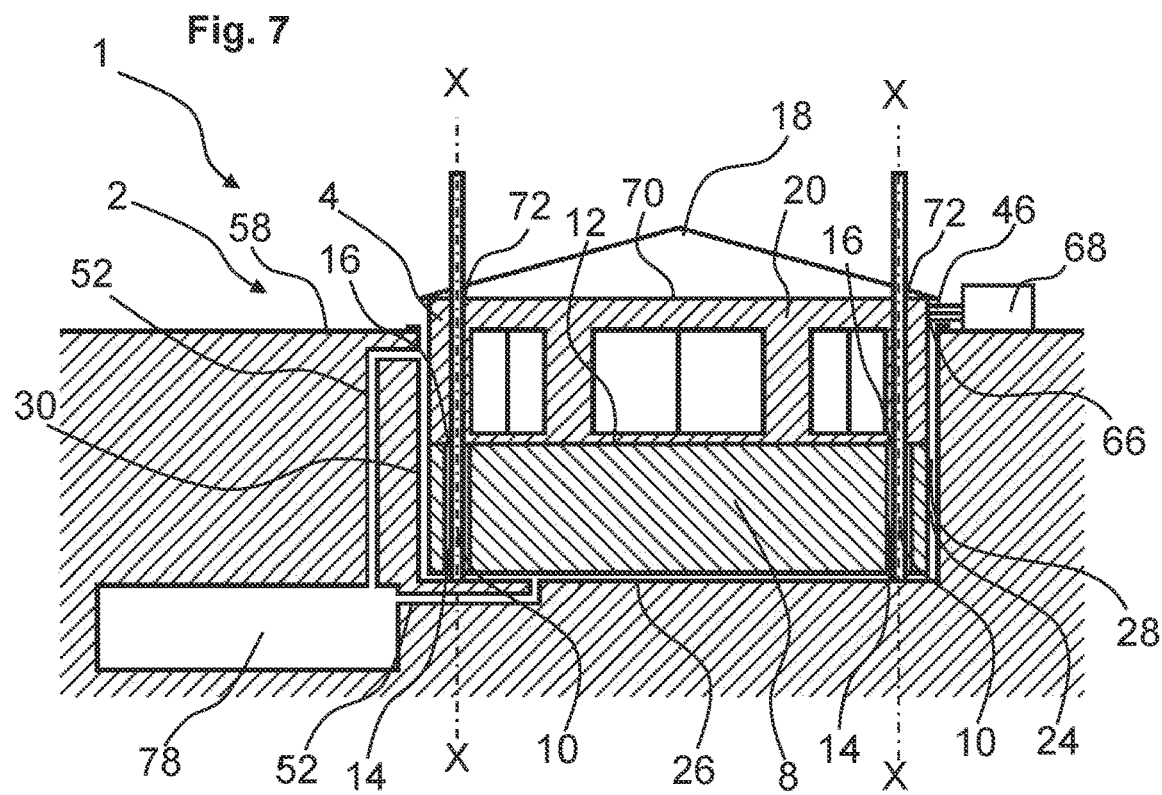
FIG. 8 shows a partial section view axially to a pile mooring axis through the embodiment of the building development in FIG. 6 in a low-lying position.

In FIGS. 1, 2, and 12, a central pile mooring 10 is connected to the bottom 26 of the basin 24, and in FIGS. 6 to 8, two or three pile moorings are connected to the bottom 26 of the basin 24. In this embodiment, the building development 1 can be particularly advantageously erected without any restrictions regarding location. Accordingly, such a building development base 2 can be used as a foundation of the building 4.

The building development base 2 with a basin 24 furthermore has an advantageous damping effect in contrast to classical concrete foundations, especially in areas prone to earthquakes. This shock absorption is achieved by means of the advantageous interaction between the basin 24 filled with liquid and the pontoon 8 floating on the liquid. The basin 24 serves especially as a buffer for the primary energy generated during an earthquake so as to offer less static contact surface especially when erected in a clearly predefined sand/gravel bed. Only a low seismic magnitude of ultimately secondary energy thus acts on the building 4 arranged on the pontoon 8 or on the building development base 2.

The pontoons 8 depicted in FIGS. 3, 10, and 11 are advantageously configured as a plate with a flat side facing in the direction of the liquid. Especially the embodiment of the pontoon 8 according to the embodiment in FIG. 3, which is rotatable about the central pile mooring 10, is as a result configured as a circular plate, so that a gap 28 between the pontoon 8 and a wall 30 of the basin 24 can be kept as small as possible and the rotation is still possible.

FIG. 10 shows an advantageous embodiment of the pontoon 8, according to which the latter is configured as a rectangular plate. The rectangular shape in particular of the pontoon 8 when there is a rectangular building 4 on the building development base 2 enables a better weight distribution and surface utilization. FIG. 11 shows an embodiment, according to which the pontoon 8 is configured as an L-shaped plate and is particularly advantageous for L-shaped building developments.

The pontoon 8 of the building development base 2 depicted in FIGS. 1 to 3 and 12 can be aligned and positioned rotationally around the pile mooring axis X by means of a motor 32, not depicted in FIG. 12, which is configured as immovable with respect to the pontoon 8. Here, a gearing is suitably configured and arranged in such a way that the force of the motor 32 can act on a force application element 34 of the pile mooring 10. Part of the transmission and the force application element 34 of the pile mooring 10 are shown as an example in FIGS. 4 and 5.

The motor 32 is configured particularly advantageously as an electric motor, one variant of which can be digitally controlled. FIG. 5 shows an arrangement variant of the motor 32, the gearing, and the force application element 34. The motor 32 is configured in particular in such a way that the pontoon 8 can be aligned and positioned by 360° around the pile mooring axis X.

Particularly advantageously, the digital control enables an automated positioning, dependent, for example, on the time of day, the position of the sun, or the room temperature of the building 4 arranged on the building development base 2.

The motor 32 is suitably provided with a braking and/or blocking function. This function makes it possible to limit or prevent a rotation of the pontoon 8 around the pile mooring axis X, so that in particular no further mooring or blockage element is needed to retain a selected alignment of the pontoon 8.

As shown in FIG. 5, the motor 32 which is immovably arranged on the pontoon 8 has a specific drive height 36 with respect to the bottom of the receiving chamber. The force of the motor 32 is transmitted to the force application element 34 of the pile mooring 10 at this drive height 36. A support 38, with which the drive height 36 is adjusted, is arranged between the pontoon 8 and the motor 32 in the shown exemplary embodiment. As depicted in FIGS. 4 and 5, the force application element 34 advantageously extends axially over a drive section 40 of the pile mooring 10. With a displacement of the pontoon 8 within the displacement range 22 toward the pile mooring the drive section 40 is displaced in the same proportion relative to the drive height 36. The motor 32, the gearing, and the force application element 34 are in particular configured in such a way that with a displacement of the pontoon 8 relative to the pile mooring 10 axially to the pile mooring axis X, the force of the motor can act on the force application element 34 for as long as the drive height 36 is located within a range of the drive section 40.

In the embodiment depicted in FIG. 5, the gearing is configured as a gear transmission. Here it is advantageous that the force of a driven gear wheel 42 connected to the motor 32 can act in particular by means of the force application element 34 on a drivable gear wheel 44 which is rotationally fixed on the pile mooring 10, whereby the drivable gear wheel 44 is displaceably mounted axially to the pile mooring axis X within the displacement range 22.

According to a preferred embodiment, which is not depicted, the gearing is configured as a bevel gear transmission. It is advantageous if a bevel gear connected to the motor 32 can transmit the force to a crown wheel that is at least rotationally fixed on the pile mooring 10. According to the embodiment depicted in FIG. 5, the crown wheel with force application elements 34 that extend axially to the pile mooring axis X is preferably rotationally fixed on the pile mooring 10 and is in particular displaceably mounted axially to the pile mooring axis X within the displacement range 22.

In the embodiment depicted in FIGS. 1 to 5, the displacement range 22 is configured, for example, over 1 m, so that low waves can be advantageously compensated for. With an arrangement of the building development base 2 in the basin 24, a smaller displacement range 22 is also possible. With a building development 1 that is mounted to movably rotate around the pile mooring 10, the displacement range 22 can also be configured as greater than 1 m.

Arranged in the receiving chamber in particular are connection means for connecting at least one supply line 46 for a connection system of the building 4. The pile mooring 10 is suitably configured at the same time as a hollow body, as shown as an example in FIGS. 4 and 12 and has at least one supply channel 48. At least one supply line 46 of the connection system, which is configured for connecting to the connection means in the receiving chamber, is preferably guided through the supply channel 48. The connection system relates especially to the water and/or wastewater and/or electric power and/or telecommunications systems. At least one supply line 46 can suitably also be configured as a hollow pipe and be guided through the pile mooring 10 so that a connection system can be retrofitted.

In particular, with the connection means and the supply lines 46 guided through the supply channel 48, no additional installation space, which would represent an obstacle, is required. A particularly preferred embodiment is depicted in particular in FIG. 1, according to which the connection system is guided through a ground section 50 and is thus not visually recognizable or manipulable, or routed in an interfering manner. In this sense, visual appearance is not disadvantageously affected by the connection system, and the connection system is protected against environmental conditions.

The supply line 46 is preferably configured in such a way that it can compensate for an axial displacement of the pontoon 8 relative to the pile mooring 10 along the pile mooring axis X. The supply line 46 can preferably be configured in such a way that it can compensate, for example, for a displacement of the pontoon 8 within the displacement range 22 depicted in FIG. 4.

Especially in the embodiment of the building development base 2 according to FIGS. 1 to 3 and 12 with the pontoon 8 rotatable around the pile mooring 10, the supply line 46 is particularly configured in such a way that it can compensate for a rotation of the pontoon 8 around the pile mooring axis X, specifically by 360°. For this embodiment at least one connection means is configured as a mechanical latch contact and/or a sliding contact and/or a ball-bearing mounted plug-in contact for the electrical lines and/or pivotable coupling and/or rotatable high temperature pipe connection for the water lines. In particular, at least one supply line 46 is configured as a pipe-to-pipe connection running coaxially to the pile mooring axis X in order to simultaneously guide a wastewater flow and a freshwater flow.

FIG. 12 shows as an example a particularly advantageous embodiment of the building development base 2 with a pontoon 8 that is rotatable around the pile mooring axis X. As depicted, a connection means is preferably configured as a sliding contact having a current collector 90 fixed to the pontoon 8 and a slip ring 86 configured so as to be at least rotationally fixedly arranged on the pile mooring 10. The slip ring 86 in particular is connected to a supply line 46 configured as a power line 84 guided through the pile mooring 10 for connection to the communal power grid. Metal rails 88, in particular five metal rails 88, are suitably arranged circumferentially around the slip ring 86, wherein the current collector 90 can contact the metal rails within an angular section of 360° around the pile mooring axis X. The current collector 90 is especially connected to a conductor rail 94, which is guided within a current conductor 92 up to and into an area of the slip ring 86, so that the current collector 90 can contact the metal rails 88 of the slip ring 86 as shown. A preferred arrangement, according to which the current conductor 92 runs toward the ceiling 70 and is secured by means of a mount 96 is further depicted in FIG. 12. The supply system is arranged in this way in the receiving chamber in an advantageous space-saving manner.

Another supply device suitable for a pontoon that can be displaced toward the pile mooring axis and/or can be rotated about the pile mooring axis provides for at least one intermediate reservoir to be arranged in the building 4 or in the pontoon 8, wherein the intermediate reservoir has at least one connection means which is not continuously connected to the supply line 46. Intermediate reservoirs can in particular be current collectors or wastewater and freshwater reservoirs. According to an advantageous embodiment, the freshwater reservoir and/or the wastewater reservoir can in particular consist of several, specifically four, circumferentially arranged and preferably fluidically interconnected tanks, in particular plastic tanks.

The pontoon 8 can be suitably transferred into a supply position, as shown in FIG. 12, in which the connection means can be connected to the supply line 46, so that the intermediate reservoir can be filled or emptied. In the supply position, the intermediate reservoir can be manually or automatically connected to the supply line 46 which is arranged in the pile mooring 10 in particular by means of a motor splint and/or a bayonet closure. As shown in FIG. 12, in the supply position, the wastewater line 82 is connected to the supply line 46 for wastewater. At the same time, the intermediate reservoir is configured such that the building development 1 can be supplied from the intermediate reservoir via the respective connection system for a specific period of time, at least until the supply position is reached again.

A line carrying a liquid, in particular the freshwater line 80 and/or the wastewater line 82, can be configured as a high-strength flexible tube in order to compensate for an axial and/or rotational displacement of the pontoon 8 relative to the pile mooring 10 along the pile mooring axis X. Such a high-strength flexible tube is preferably used for a fluid bridging from the supply line 46 in the pile mooring 10 to a pipe system, especially to the intermediate reservoir installed in the pontoon 8 or in the building 4.

The intermediate reservoir can also advantageous be a current collector, for example an accumulator. In the supply position, it can be charged, for example, via a fuel cell and/or a wind turbine and/or a photovoltaic system and/or the communal power grid, whereby other techniques are also possible. The current collector can suitably also be charged by means of an induction system. The pontoon 8 preferably has a coil which is used by an antagonistic coil to inductively charge the current collector via a magnetic field that is within a functional range, in particular in an edge area of the building development base 2. The functional range for inductively charging the current collector is accordingly ensured, at least in the supply position.

According to a variant of the intermediate reservoir, the pontoon 8 preferably has components that function as solid heat reservoirs. In addition or alternatively, a latent heat reservoir, especially a paraffin or salt hydrate, is also suitable for storing and efficiently using heat.

The supply position can preferably be randomly selected, for example, it can be the position in which the pontoon 8 is predominantly arranged.

The supply position can in particular be a specific rotational alignment of the pontoon 8; this embodiment is particularly advantageous with a pontoon 8 moving rotationally around the pile mooring 10 like that of the embodiment of FIGS. 1 and 12. In this way, rotational connection means or supply lines 46 can be particularly advantageously dispensed with. FIG. 12 schematically depicts how the wastewater line 82, which is connected to a wastewater reservoir (which is not shown) inside the building 4 and/or the pontoon 8, is connected to the supply line 46 for wastewater in the supply position.

The supply position with rotationally determined pontoons 8, like the embodiment in FIGS. 6 to 9, can suitably be a specific height measured axially to the pile mooring axis X between the pontoon 8 and the bottom 26 of the basin 24.

Particularly advantageously, the supply position can be activated automatically, for example, during the night, so that filling or emptying the intermediate reservoir can ideally be implemented without conflicts and with the least disruption for the residents of the building 4.

Advantageously for ecological and economic use of the building development 1 and/or the building development base 2, the building development 1 or the building development base 2 has at least one treatment plant, particularly for graywater and/or rainwater. Graywater can be suitably recycled at the same time by using photocatalytic ceramic foams and suitably collected in an intermediate reservoir. Rainwater can likewise be treated for the water supply and/or stored temporarily in intermediate reservoirs. The liquid on which the pontoon 8 floats. provided it consists predominantly of water, can also be processed for further use by employing suitable recycling methods.

In the embodiments depicted in FIGS. 1 and 6 to 9 the pile mooring 10 can be configured in particular as a steel pipe wherein, as an alternative to the round pile moorings depicted in FIGS. 4 and 5, the pile mooring 10 can also be configured, in an embodiment which is not depicted, as having a rectangular profile.

In order to ensure the continuing applicability of the building development base 2 with a basin 24 in many locations, the liquid is on occasion provided with additives. The additives preferably prevent the growth of algae and/or lower the freezing point of the water. The addition of additives which lower the freezing point is advantageous in order to prevent damage due to frost, particularly in locations with temporary or constant temperatures near or below the freezing point. A building development base 2 and the concept of a floating building as residential housing can thus be advantageously implemented independently of an existing body of water. The building development base 2 with a basin 24 is therefore an alternative to classic buildings on foundations at the same time as it has the advantages of the floating arrangement, especially the earthquake protection.

As depicted, especially in FIGS. 3, 10, and 11, the building development base 2 has a circumferentially configured gap 28 between the pontoon 8 or the floats 6 and a wall 30 of the basin 24. The gap 28 is suitably kept as small as possible, while the gap 28 is configured in particular within a range of 1000 cm to 10 cm, preferably within a range of 100 cm to 15 cm, advantageously within the range of 40 to 20 cm. The gap 28 is suitably adapted to the possible translational movement freedom of the pontoon 8 across the liquid surface, which results especially from the play between the pile mooring 10 and the passthrough opening 14.

In another aspect, the gap 28 between the wall 30 of the basin 24 and the pontoon 8. as well as the distance between the passthrough opening 14 and the pile mooring 10, are configured in such a way that an adequate absorption of short and long geological shockwaves or seismic waves is possible, so that earthquake protection is provided.

The basin 24 is suitably provided with an integrated, in particular pump-supported inlet and outlet 52, as depicted in FIGS. 1 and 6 to 9. As an alternative or additionally, the liquid is conveyed within a fluidic circuit by means of the inlet and outlet 52 in particular for purposes of purification and/or temperature control.

The inlet and outlet 52 are especially configured so that the surface level of the liquid in the basin 24 can be variably selected and readjusted. The pontoon 8 is preferably configured to be axially displaceable relative to the pile mooring 10 along the pile mooring axis X within the displacement range 22. The variable surface level of the liquid has the advantage that the pontoon 8, together with the building 4, can be totally or partially lowered into the basin 24, for example, for protection following a storm warning. Advantages arise furthermore from the fact that the pontoon 8 can be lifted from the normal position depicted in FIG. 6 in the direction of the elevated position depicted in FIG. 7. Beside the further advantage of being able to adapt the building development base 2 to the total load over the building development base 2 and being able to keep the distance of the pontoon 8 to the bottom 26 of the basin 24 within an allowable range, there also arise advantages for the comfort and accessibility of the user. The variable surface level of the liquid can, in particular provide privacy protection for the building 4 when the building development base 2 is lowered, as well as enabling ground-level access for wheelchair users and for loading and unloading purposes.

In a particularly advantageous embodiment, the building 4 and/or the building foundation 2 is provided with the connection means for connecting at least one supply line 46 for a connection system of the building 4. The supply line 46 is preferably suitably guided through the supply channel 48 of the pile mooring 10, wherein the supply line 46 according to another variant is configured in such a way that it can compensate for an axial displacement of the pontoon 8 relative to the pile mooring 10 along the pile mooring axis X. The supply line 46 guided through the supply channel 48 is advantageously protected from outside influences as previously described with reference to FIG. 4.

As shown in FIG. 6, the pile mooring 10 preferably has an overhang 54 with respect to a surface 12 which faces toward the building 4 in the normal position of the pontoon 8 relative to the pile mooring 10. The displacement range 22 advantageously extends at least partially over the overhang 54, so that the pontoon 8 can float at least from the normal position up to an elevated position within the displacement area 22.

The normal position suitably corresponds to a positioning of the pontoon 8 relative to the pile mooring 10 in which the pontoon 8 is essentially arranged above, that is in relation to other positions, for most of the time. The displacement area 22 extends, for example, between a normal position in which the pontoon 8 is normally arranged, and the elevated position, for example, with high tide or flood, when the pontoon 8 floats exceptionally high, or a correspondingly adapted surface level of the liquid in the basin 24.

The dimension of the overhang 54 determines in particular the maximum possible upward floatation height and can be advantageously adapted to local conditions, for example, a flood zone. The exemplary embodiments according to FIGS. 1, 2, 4, and 5 in particular thus have a relatively small overhang 54 compared to the exemplary embodiment according to FIG. 6.

According to the exemplary embodiment in FIGS. 4 and 5, the displacement area 22 of the pile mooring 10 can be configured in such a way that the pontoon 8 can descend, from the normal position of the pontoon 8 relative to the pile mooring 10 in the direction of the liquid to a low-lying position within the displacement range. The building development base 2, which is depicted in normal position in FIG. 6, is especially configured for a pronounced descent, which is depicted in FIGS. 8 and 9.

According to the advantageous embodiment depicted in FIG. 1, the pontoon 8 has an advantageously radial overhang 56 which, when sunk to a ground, comes to rest on the edge of the building development base 2. In one advantageous aspect, the radial overhang 56 enlarges a developable area of the building development base 2 or the pontoon 8. In a second advantageous aspect, the radial overhang 56 is configured in such a way that the pontoon 8 with the overhang 56 can rest on an area of earth 58. In this way, the pontoon 8, in a low-lying position, is advantageously prevented from resting on the bottom 26 of the basin 24 because adhesive forces could occur which would prevent a refloating of the pontoon 8.

Figure 9:
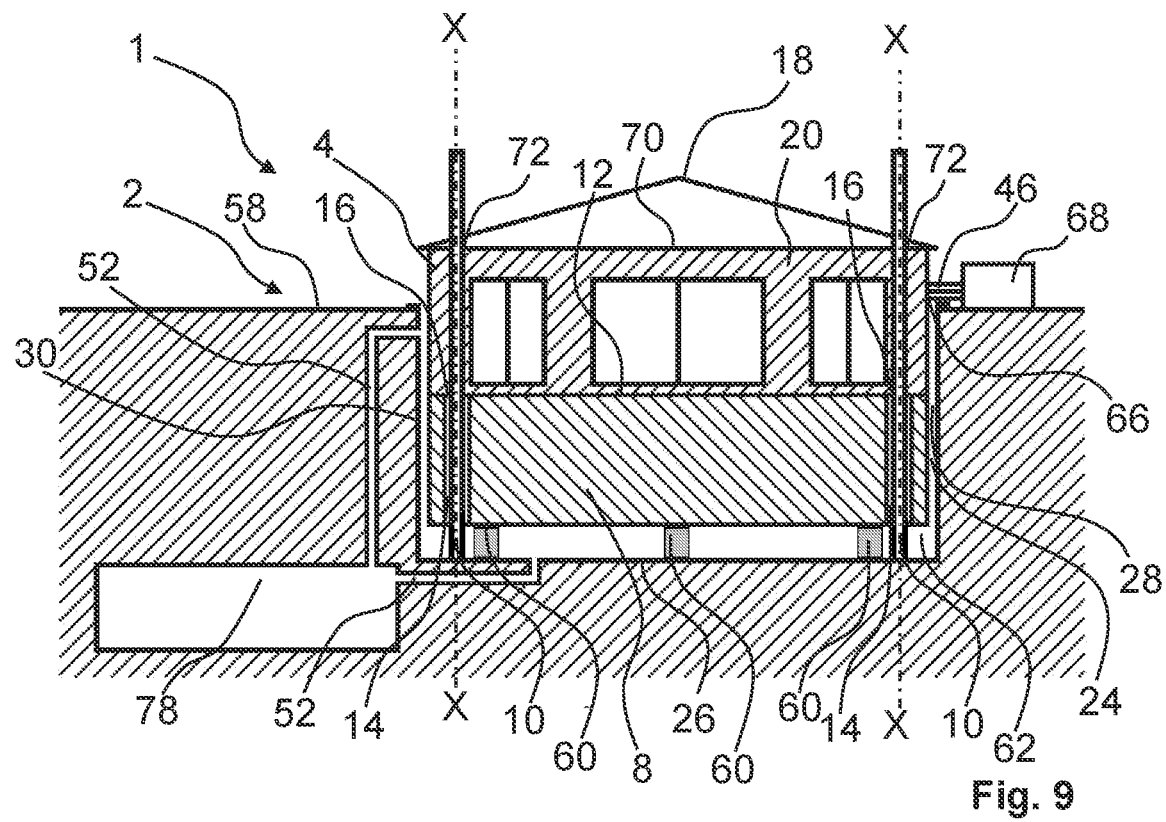
FIG. 9 shows a partial section view axially to a pile mooring axis through another embodiment of the building development in the low-lying position.

In the exemplary embodiment according to FIG. 9, an adhesive connection between the pontoon 8 and the bottom 26 of the basin 24 is prevented in that support blocks 60 that extend in the direction of the pontoon 8 are configured on the bottom 26 of the basin 24. The support blocks 60 are especially configured in such a way with regard to number, arrangement relative to the pontoon 8, and structure, that the pontoon 8 rests evenly in one plane on the support blocks 60 and is evenly supported. In this way, tilting of the pontoon 8 with the pile mooring(s) 10 is advantageously prevented.

The radial overhang 56 and/or the support blocks 60 can in particular be configured in such a way that an assembly chamber 62 is configured between the pontoon 8 and the bottom 26 of the basin 24 when the pontoon 8 in arranged in its low-lying position, especially when the liquid has been completely discharged from the basin 24. The assembly chamber 62 advantageously serves the purposes of repair, maintenance, and inspection of the building development base 2.

At least one supply line 46 is configured as a telescoping line in an embodiment which is not depicted in order to compensate for an axial displacement of the pontoon 8 relative to the pile mooring 10 along the pile mooring axis X.

According to another advantageous embodiment of the connection system depicted in FIGS. 6 to 9, the supply lines 46 are configured, in particular, as flexible and are arranged laterally to the building 4, so that the supply lines 46 are guided perpendicularly to the pile mooring axis X through an inlet opening in a façade 20 of the building 4 or the pontoon 8 in the building 4 or the building development base 2. The inlet opening is preferably configured in such a way that it extends from an elevated position inlet 64 in the pontoon 8, which is depicted in FIG. 7, to a low-lying inlet 66, which is depicted in FIGS. 8 and 9, within the building 4, so that the supply lines 46 are conducted in a constant position with respect to the basin 24 within the building 4. For this purpose, the inlet opening is configured in particular as a slot that extends axially to the pile mooring axis X or a lateral recess in the façade 20 of the building 4 and in the pontoon 8. The recess has in particular a width ranging from 100 cm to 40 cm and a depth ranging from cm to 20 cm, preferably a width ranging from 80 cm to 50 cm and a depth ranging from cm to 25 cm, advantageously a width of 60 cm and a depth of 30 cm. The slot-like design of the inlet opening or the execution as a recess has the advantage that a section of the supply lines 46 that is exposed to environmental influences can be made as small as possible.

The building development 1 has one technology module at least on one side of the building 4 and/or the pontoon 8 and/or the peripheral area of the building development base 2. The technology module serves in particular the purpose of making available a constantly adapted length of the supply line 46 during an axial displacement of the pontoon 8 along the pile mooring axis, without at least one partial section of the supply line 46 being arranged loosely or unattached within the area between a utility and the connection means in the building 4 or the pontoon 8. In a variant of the technology module, the latter exerts a previously defined tensile stress on the supply line 46. This technology module can be configured in particular as a cable reel subjected to a spring force and/or as a motor-driven cable reel. With a vertical movement of the pontoon 8 along the pile mooring axis X and the resulting tension on the respective supply line 46, the supply line 46 is rolled off the cable reel against the tensile stress. With a movement of the pontoon 8 along the pile mooring axis X, which causes a reverse movement of the supply line 46 in direction of the tensile stress, the respective cable reel is rotationally driven by means of the spring force or the motor power of the respective cable reel and the supply line 46 is rolled up onto the cable reel.

According to another embodiment, the technology module does not exert a constant tensile stress but has an electric motor with a freewheel. Advantageously, the technology module has a smooth-running shaft with ball-bearing and a motor drive. Part of this shaft are cable reels of different sizes for different supply lines 46, which allow the respective supply lines 46 to unroll freely during a vertical movement of the pontoon 8 along the pile mooring axis X and the tension resulting therefrom. For rewinding, the respective supply lines 46 are rolled up around the motor-driven cable reel. In the exemplary embodiment in FIGS. 6 to 9, the building development 1, especially the building development base 2, has in its peripheral area a utility box 68 into which at least one connection system is lead and in which in particular at least one technology module can be arranged.

The at least one supply line 46, especially the supply line 46 for freshwater, is preferably routed through a lateral groove running axially to the pile mooring axis X into the pile mooring 10 in the pontoon 8 or the building 4, so that especially a compensation of a displacement of the pontoon 8 axially to the pile mooring axis X toward the pile mooring 10 is possible, wherein the supply line 46 remains fluidically connected to the communal power grid. A reel/spool for rolling on and/or off the respective supply line 46 is advantageously arranged in the pontoon 8 or the building 4. The reel/spool has, in particular, a hose reserve of respectively 7.5 m for floating or lowering the pontoon in a normal position of the pontoon 8.

The building 4 in particular has a second breakthrough 72 in a ceiling 70 and/or the roof 18 in the area above the passthrough opening 14, so that an overhang 54 of the pile mooring 10 can be arranged in the second breakthrough 72. In the example depicted in FIG. 6, the overhang 54 of the pile mooring 10 is already arranged in the second breakthrough 72 in the normal position, so that floating up into the elevated position, which is depicted in FIG. 7, is possible. The second breakthrough 72 is preferably configured in such a way that it passes in its entirety axially to the pile mooring axis X through the structure, so that in a low-lying position depicted in FIGS. 8 and 9 the overhang 54 is guided through the building 4.

The second breakthrough 72 is advantageously provided with a manual or automatic closure for protection from weather situations, which seals the second breakthrough 72 if the pile mooring 10 is not arranged in the second breakthrough 72.

According to a variant of the building development 1, which is not depicted, the passthrough opening 14 is arranged in an area of the pontoon 8 in which the building 4 is not arranged. In this variant, the passthrough opening 14 is regularly arranged in a peripheral area of the pontoon 8. The overhang 54 of the pile mooring 10 can in this way be advantageously configured greater than the pontoon 8 and the chambers of the building 4 can be configured homogeneously, in particular, free of a first, second, or other breakthroughs above the passthrough opening 14.

In an especially advantageous type of the building development 1, which is particularly depicted in FIGS. 8 and 9, the basin 24, the pile mooring 10, and the building 4 are configured in such a way with respect to each other that the basin 24 has a depth 74 measured axially to the pile mooring axis X, and the displacement plane 22 of the pile mooring 10 is configured in such a way in the direction of the liquid that the building 4 is arranged at least partially within the basin 24 in the low-lying position of the pontoon 8.

In a particularly advantageous embodiment of the building development 1, which is not depicted, the basin 24, the pile mooring 10, and the building 4 are configured in such a way with respect to each other that the depth 74 of the basin 24 measured axially to the pile mooring axis X is greater than or equal to a height 76 of the pontoon 8, including the building 4 measured axially to the pile mooring axis X. At the same time, the displacement area 22 of the pile mooring 10 in direction of the liquid is suitably configured in such a way that in the low-lying position of the pontoon 8, the building 4 is arranged at its entire height 76 within the basin 24.

This embodiment of the building development 1 advantageously enables privacy protection by lowering. Solar radiation on the building 4 can also be further reduced in this way. A protective aspect of this embodiment is that the basin 24 provides protection to the building 4 during storms in such a way that storm gusts themselves and objects whirled up at the building 4 encounter a reduced surface of attack.

At the same time, as depicted in FIGS. 1 and 6 to 9, the building development base 2 suitably has a reservoir 78 for liquid, said reservoir being fluidically connected to the inlet and outlet 52 of the basin 24. The fluid can thus be directed into a circuit. If the liquid contains additives, they are, in particular, prevented from leaking into the environment.

The reservoir 78 and/or the inlet are particularly preferably provided with heating means. The reservoir 78 can serve conveniently at the same time as a thermal buffer and/or reduce the need for additives to prevent damage from freezing. The inlet and outlet 52 and the basin 24 are, in particular, especially configured in such a way that the liquid in the basin 24 can be kept constantly above the freezing point, in particular over 1° C.

The basin 24 can preferably be configured with an integrated overflow protection especially in rainy regions. This can be suitably implemented by means of float valves. A maximum level of the surface of the liquid in the basin 24 can be advantageous set in a particularly easy and error-resistant way. The overflow protection can in particular route the liquid into the reservoir 78 or a catch basin or directly into a channel.

As shown in FIGS. 6 to 11, the pontoon 8 is preferably configured with at least two, in particular three passthrough openings 14, wherein one pile mooring 10 respectively extends respectively along a pile mooring axis X vertically through the respectively one passthrough opening 14 of the pontoon 8. This embodiment blocks both a rotation and a translation of the pontoon 8 on the surface of the liquid.

In an embodiment of the building development base 2 with two or more pile moorings 10, the pile moorings 10 can advantageously be arranged in an edge region of the pontoon 8, so that more homogeneous installation space is available in the building 4, especially at the center of the pontoon 8.

In plan view, in the direction of the liquid, the building development base 2 with at least two pile moorings 10 has in particular an angular profile, for example, a rectangular profile, as depicted in FIG. 10, or an L-shaped profile, as depicted in FIG. 11. Because the rotation of the pontoon 8 is restricted by the two pile moorings 10, the basin 24 can be adapted to the shape of the pontoon 8, and the pontoon 8 is prevented from colliding with the wall 30 of the basin 24.

The pontoon 8 is advantageously provided with a manual and/or automated, in particular a hydraulic level regulation system. The level regulation system aligns the pontoon 8 in particular with its surface 12 facing toward the building 4 within a horizontal plane by means of slidable load entries in the float 6. It is particularly advantageous if the level regulation system is configured in such a way that it can constantly monitor and preferably constantly readjust the alignment of the pontoon 8. The level regulation system can advantageously compensate for weight differences which result from an uneven weight distribution of the building development 1, especially over the building development base 2. Furthermore, a draught of the pontoon 8 can be adapted by means of the level regulation system depending on the total load over the building development base 2.

In addition, the level regulation system preferably has an alarm unit that sends a signal to the user when there is a weight difference that can no longer be compensated for and determines the location of the critical weight difference. As a result, the user has the possibility of detecting a critical weight difference early and adapting the weight distribution over the building development base 2.

The pontoon 8 in particular has a plurality of floats 6. In FIG. 2 the pontoon 8 is configured with only one float 6. In a preferred embodiment, each of the floats 6 can furthermore have individual chambers which can be statically or dynamically adapted, depending on the weight distribution, by the level regulation system. For example, individual chambers or whole floats 6 can be flooded with the liquid, or the liquid can be drained. The liquid can be a separate compensating liquid arranged in a circuit of the level regulation system, or it can be the liquid on which the pontoon 8 floats. Compensation for the draught when there is an increase or decrease of a total load on the building development base 2 is possible, in particular if the level regulation system is connected to the liquid on which the pontoon 8 floats.

The level regulation system is suitably improved or made available by means of intermediate reservoirs. For this purpose, fluidic intermediate reservoirs are preferably arranged circumferentially inside the pontoon 8 or the building 4. The liquids in the tanks of the freshwater reservoir or the wastewater reservoir are systematically circulated for level regulation, preferably with the assistance of a pump. As previously described, the distribution of the weight of the pontoon 8 to variable loads can advantageously be dynamically adjusted in this way.

The building development 1 or the building development base 2 preferably has a maintenance shaft. This embodiment is not depicted. This maintenance shaft is arranged in an edge region of the development base 2 behind the wall 30 of the basin 24 on the side facing toward the liquid. The maintenance shaft has in particular an entrance that is accessible from the outside of the basin 24 and a passage is especially configured in the wall 30 of the basin 24 in the area of the maintenance shaft, so that a person can access the assembly chamber 62 in the area between the bottom 26 of the basin 24 and the pontoon 8 through the maintenance shaft, at least in the elevated position of the pontoon 8. The repair, maintenance, and inspection, in particular, of the building development base 2 is made easier in this way. The pontoon 8 can be suitably arranged in the elevated position and/or the normal position specifically by means of supports, the support blocks 60, and/or the radial overhang 56, so that the liquid can be discharged from the basin 24 and the space between the bottom 26 of the basin 24 and the pontoon 8 be maintained and be largely dry.

Particularly if electronic applications are arranged in the maintenance shaft, the opening in the wall 30 of the basin 24 leading to the maintenance shaft can suitably be fluidically sealed, so that the maintenance shaft remains dry when the basin 24 is filled with the fluid.

The maintenance shaft around the basin 24 can suitably be configured as wholly or partially circumferential. Especially if the inlet and outlets 52 are arranged spaced apart or, for example, on two different walls of the basin 24; the inlet and outlet 52 are then more easily accessible for a person, which likewise facilitates repair, maintenance, and inspection.

Figure 13:
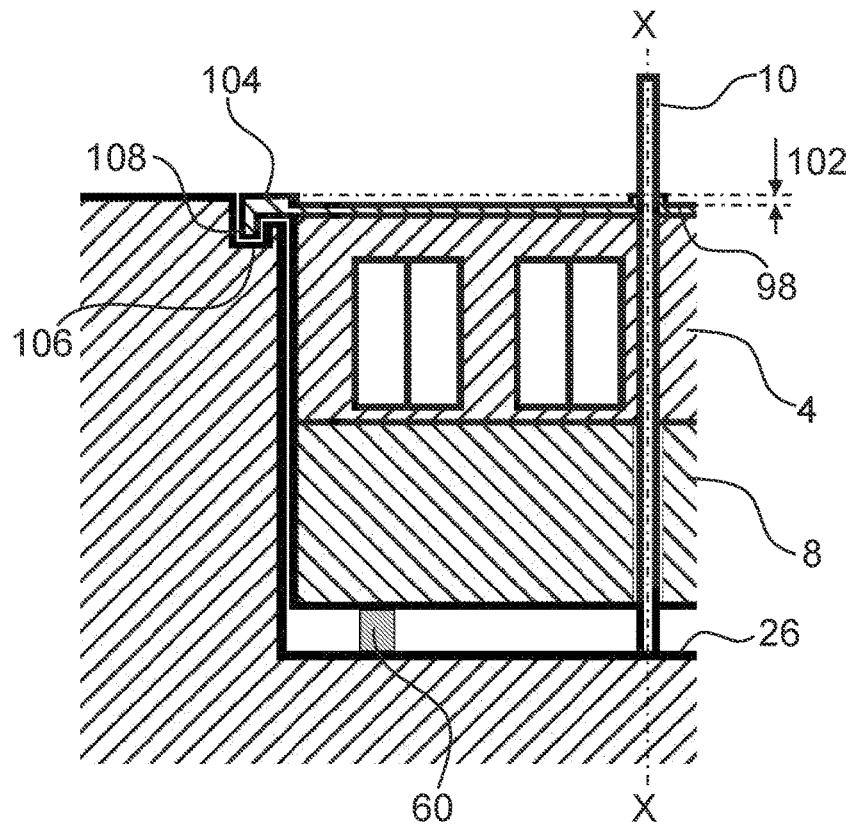
FIG. 13 shows a partial section view axially to a pile mooring axis through another embodiment of the building development with a central pile mooring in a low-lying position.
Figure 14:
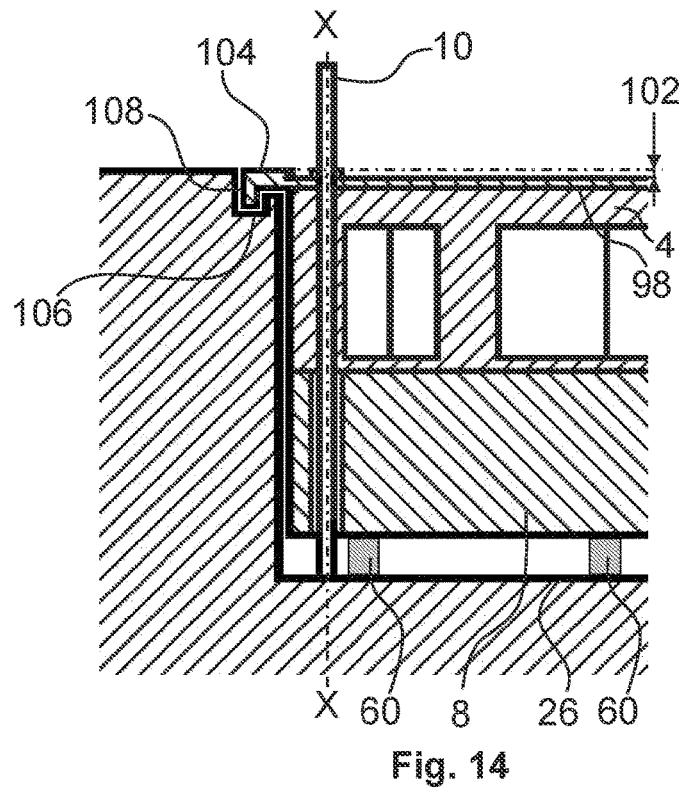
FIG. 14 shows a partial section view axially to a pile mooring axis through another embodiment of the building development having at least one decentralized pile mooring in a low-lying position.

Another advantageous embodiment is depicted in FIGS. 13 and 14. Here, the aforementioned embodiments are supplemented with a non-flammable roof construction.

As depicted in FIGS. 13 and 14, the building 4 preferably has for this purpose a flat roof construction 98, which features a tub-like, water-tight, open water basin 100 facing counter to the direction of the basin 24. The water basin 100 can be flooded, if needed, with the liquid from the basin 24. The use of a pump arrangement has proven especially advantageous for flooding the water basin 100.

In case of fire, a heat barrier is created by the water in the water basin 100. According to a preferred embodiment, the water basin 100 has a peripheral installation height 102 as depicted in FIGS. 13 and 14. As a result, the installation height 102 limits a maximum water height, wherein the installation height 102 and the maximum water height is at least 30 cm. Here, a water height of 30 cm has proven effective in delaying heating of the building 4 underneath the flat roof construction 98.

The flat roof construction 98 particularly advantageously has a peripheral roof overhang 104. In a lowered state of the building 4 in the basin 24, especially in the low-lying position depicted in FIGS. 13 and 14, the roof overhang 104 slots, in particular level with the ground, into a groove 106 running circumferentially around an upper basin edge. The basin wall advantageously protects the side walls of the building 4, so that, for example in the event of fire, only the surface of the flat roof construction 98, whose surface largely corresponds to that of the water basin, is exposed to the elevated temperature. In particular, without local fuel for the flames due to the submersion of the building 4, a fire event (firestorm) that is driven by strong winds, passes in a very short time over the building 4.

In a further-developed advantageous embodiment, the roof overhang 104, in the lowered state of the building 4 in the basin 24, in particular in the low-lying position, depicted in FIGS. 13 and 14, slots with a flute 108 into the groove 106 at the basin edge. Advantageously, there is no contact between the roof overhang 104 or the flute 108 and the basin 24 or the groove 106. It has additionally proven advantageous if the groove 106 is flooded or can be flooded with a liquid, especially the liquid in the basin 24.

The groove 106 that is flooded with water provides cooling and protection from invasive flue gases. The contactless arrangement of the flute 108 in the groove 106 also has the advantage of preventing heat transfer.

According to an advantageous, previously-mentioned embodiment, in the event of fire, the pontoon 8 can sink into the low-lying position in a direction facing the liquid relative to the pile mooring 10 along the displacement range 22 of the pile mooring starting in particular from the normal position of the pontoon 8. For this purpose, as in the aforementioned embodiments, the liquid is effectively discharged from the basin 24. The water basin 100 and/or the groove 104 are advantageously flooded with part of the liquid discharged from the basin 24. In this state, the low-lying position of the pontoon 8, the roof surface of the flat roof construction 98 is effectively arranged level with the ground in the edge areas of the basin 24 and the flute 108 is preferably arranged in the described manner in the groove 104 filled with water. In FIGS. 13 and 14, the support blocks 60 are in particular advantageously arranged in the basin in order to prevent adhesive connections between the pontoon 8 and the bottom 26 of the basin and at the same time unburden the flat roof construction 98 in the low-lying position of the pontoon 8.

The flat roof construction 98 and/or the roof overhang 104 is suitably made of fire-resistant materials, especially alloyed and/or unalloyed steel and/or ceramic composites.

The flat roof construction 98 with the water basin 100 preferably has the possibility of providing a classic rooftop garden with low lichens and/or moss and/or grass. The plant substrate used herein is preferably native soil enriched with perlite and expanded clay for weight reduction.

It is advantageously made possible to configure the aforementioned embodiments in modular form. The building development base 2 and the building 4 are especially designed in modular fashion in such a way that the building development base 2 can be effectively separated from the building 4 in a non-destructive manner, so that assembly and disassembly can be carried out repeatedly.

A relocation of the entire building structure via heavy transport over land or by waterway can thus be realized with the use of prefabricated, preferably standardized components, in particular a multipart pontoon and/or displaceable wall elements and/or a standardized basin. A foundation 2 of a building development 1 having a pontoon 8, on which a building development, especially a building 4, can be arranged is also part of the invention. The building development base 2 corresponds to one of the aforementioned embodiments of the building development base 2 according to the invention.

A pile mooring 10 of a building development 1 having a pontoon 8 on which a building development, in particular a building 4, can be arranged is also part of the invention. The pile mooring 10 corresponds to one of the aforementioned embodiments of the pile mooring 10 according to the invention.

The invention is not limited to the depicted and described exemplary embodiments but also comprises all equivalent embodiments in the sense of the invention. It is expressly emphasized that the exemplary embodiments are not limited to all the characteristics in combination, but rather that each individual, partial feature can also have an inventive significance of its own, separately from all other partial features. Furthermore, the invention is not to date limited to the combinations of features defined in claim 1 and/or 19 and/or 20 but can also be defined by any other desired combination of specific features of the entirely of disclosed individual features. This effectively means that virtually any individual feature of claim 1 and/or 19 and/or 20 can be omitted or replaced by at least one individual feature disclosed in another part of the application.

The invention claimed is:

1. A building development, having a building arranged on a building development base comprising, the building development base has a pontoon having at least one float for floating on a liquid and a pile mooring, wherein the pile mooring extends perpendicularly to the pontoon along a pile mooring axis through a passthrough opening of the pontoon,
further comprising the passthrough opening is configured centrally in the pontoon, and the pontoon is rotationally movably mounted around the pile mooring that extends through the passthrough opening, wherein the pontoon is alignable and positionable around the pile mooring axis, the pile mooring projects into a receiving chamber through the passthrough opening of the pontoon and through a first breakthrough arranged in a bottom of a receiving chamber arranged over the passthrough opening.

2. The building development according to claim 1, further comprising the building development base has a basin filled with the liquid, wherein the pontoon is arranged floating on the liquid in the basin, and the pile mooring extends out of the pile mooring axis from the bottom of the basin, wherein the pile mooring is immovably connected to the basin.

3. The building development according to claim 2, further comprising the liquid in the basin contains additives, wherein the additives lower the freezing point of the water.

4. The building development according to claim 2, further comprising the building development base has a peripherally configured gap between the pontoon or the floats and a wall of the basin, wherein the gap is configured within a range of 1000 cm to 10 cm.

5. The building development according to claim 2, further comprising the basin is provided with an integrated inlet and outlet assisted by pumps, so that a surface level of the liquid in the basin is variably selectable and readjustable.

6. The building development according to claim 5, further comprising the building development base has a reservoir, which is fluidically connected to the inlet and outlet of the basin.

7. The building development according to claim 6, further comprising the reservoir or the inlet and outlet have a heating means, the reservoir, the inlet and outlet and the basin are configured in such a manner as a heating circuit that the liquid in the basin is kept constantly above the freezing point.

8. The building development according to claim 2, further comprising the basin is configured with an integrated overflow protection, so that a maximum level of the surface of the liquid in the basin is set.

9. The building development according to claim 1, further comprising the pontoon is configured so as to displace axially relative to the pile mooring along the pile mooring axis within a displacement area.

10. The building development according to claim 9, further comprising a basin, the pile mooring, and the building are configured in such a way with respect to each other that a depth of the basin measured axially to the pile mooring is greater than or equal to a height of the pontoon including the building measured axially to the pile mooring axis, wherein the displacement range of the pile mooring is configured in such a way in the direction of the liquid that the building is configured in such a way that in the low-lying position of the pontoon the building is arranged over its entire height inside the basin.

11. The building development according to claim 1, further comprising the pontoon is configured as a plate having a flat side facing in the direction of the liquid.

12. The building development according to claim 1, further comprising the pontoon is rotationally configurable and positionable around the pile mooring axis by a motor configured as immovable with respect to the pontoon, wherein a gearing is configured and arranged so that the force of the motor acts on a force application element of the pile mooring.

13. The building development according to claim 12, further comprising the gearing is configured as a bevel gear transmission, wherein a bevel gear connected to the motor transmits the force to a crown gear fixed at least rotationally around the pile mooring, and the crown gear is displaceably mounted within a displacement range axially to the pile mooring.

14. The building development according to claim 1, further comprising a connection means for connecting at least one supply line for a connection system of the building are arranged in a receiving chamber, wherein the pile mooring is configured as a hollow body and has at least one supply channel, and at least one supply line of the connection system is guided through the supply channel, which is connectable to the connection means in the receiving chamber, wherein the supply line is configured in such a way that it can compensate for a rotation of the pontoon around the pile mooring axis.

15. The building development according to claim 14, further comprising the connection means is configured as a latch contact or loop contact or ball-bearing mounted plug-in contact for the electrical lines or pivotable coupling or rotatable high temperature pipe connection or a supply line is configured as a pipe-to-pipe connection running coaxially to the pile mooring axis to simultaneously conduct a wastewater flow and a freshwater flow.

16. The building development according to claim 1, further comprising the building or the building development base have connection means for connecting at least one supply line for a connection system of the building, wherein the supply line is guided through a supply channel of the pile mooring and the supply line is configured to compensate for an axial displacement of the pontoon relative to the pile mooring along the pile mooring axis.

17. The building development according to claim 16, further comprising the at least one supply line is configured as a telescoping line, so that an axial displacement of the pontoon relative to the pile mooring along the pile mooring axis is compensable.

18. The building development according to claim 1, further comprising the building has a second breakthrough in a ceiling in the area of the passthrough opening, so that an overhang of the pile mooring is arrangeable in the second breakthrough.

19. The building development according to claim 1, further comprising the pontoon is provided with a manual or an automated level regulation system, which aligns and readjusts a surface of the pontoon facing toward the building within a horizontal plane by means of displaceable load entries in the float.

20. The building development according to claim 1, further comprising the building is configured with a flat roof construction, which has a tub-like, water-tight, open water basin facing against the direction of the basin, wherein the water basin is floodable with the liquid in the basin.

21. The building development according to claim 20, further comprising the water basin has a peripheral installation height, which limits a maximum water height, wherein the installation height and the maximum water height is at least 30 cm.

22. The building development according to claim 20, further comprising the flat roof construction has a peripheral roof overhang, wherein the roof overhang in a lowered state of the building in the basin slots level with the ground into a groove running circumferentially around an upper edge of the basin.

23. The building development according to claim 22, further comprising the roof overhang in the lowered state of the building in the basin slots with a flute into the groove running around the basin edge without making contact with the basin, wherein the groove is flooded with the liquid in the basin.

24. The building development according to claim 20, further comprising the flat roof construction or the roof overhang is made from fire-resistant materials, including an alloyed or an unalloyed steel or a ceramic composite.

25. The building development according to claim 1, further comprising the building development and the building are modularly configured in such a way that the building development base is separable from the building in a non-destructive manner, so that assembly and disassembly can be repeatedly performed.

26. A building development base of a building development, having a pontoon on which a building development is arrangeable, further comprising features of the building development base of claim 1.

27. A pile mooring of a building development, having a pontoon on which the building development is arrangeable, further comprising features of the pile mooring of claim 1.

* * * * *